US008614760B2

(12) United States Patent
Nobels

(10) Patent No.: US 8,614,760 B2
(45) Date of Patent: *Dec. 24, 2013

(54) DEVICE AND METHOD FOR INSERTING CAPTURED IMAGE DATA INTO A DOCUMENT

(75) Inventor: Jonathan Nobels, Guelph (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,452

(22) Filed: Aug. 25, 2011

(65) Prior Publication Data

US 2012/0019682 A1    Jan. 26, 2012

Related U.S. Application Data

(63) Continuation of application No. 12/051,055, filed on Mar. 19, 2008, now Pat. No. 8,018,518, which is a continuation of application No. 10/786,002, filed on Feb. 26, 2004, now Pat. No. 7,365,787.

(51) Int. Cl.
*H04N 5/222* (2006.01)

(52) U.S. Cl.
USPC ................................. 348/333.01; 348/211.2

(58) Field of Classification Search
USPC ............ 348/333.01, 333.02, 209.99, 207.11, 348/211.1–211.3, 211.6, 220.1
See application file for complete search history.

(56) References Cited

U.S. PATENT DOCUMENTS

| | | | | |
|---|---|---|---|---|
| 5,008,854 A | * | 4/1991 | Maeda et al. | 345/641 |
| 5,596,753 A | * | 1/1997 | Bhatt | 719/320 |
| 5,943,603 A | * | 8/1999 | Parulski et al. | 725/133 |
| 6,249,275 B1 | * | 6/2001 | Kodama | 345/173 |
| 6,466,830 B1 | * | 10/2002 | Manross et al. | 700/83 |
| 6,961,004 B2 | * | 11/2005 | Kumar | 340/11.1 |
| 7,365,787 B2 | * | 4/2008 | Nobels | 348/333.02 |
| 8,018,518 B2 | * | 9/2011 | Nobels | 348/333.02 |
| 2002/0051181 A1 | * | 5/2002 | Nishimura | 358/1.15 |
| 2003/0064685 A1 | * | 4/2003 | Kim | 455/90 |
| 2003/0177448 A1 | * | 9/2003 | Levine et al. | 715/530 |
| 2004/0095474 A1 | * | 5/2004 | Matsufune | 348/220.1 |

FOREIGN PATENT DOCUMENTS

| | | |
|---|---|---|
| EP | 1349407 A2 | 10/2003 |
| GB | 2315186 A | 1/1998 |
| JP | 10-027255 A | 1/1998 |
| WO | 0198885 A1 | 12/2001 |

OTHER PUBLICATIONS

"Smartphone Aus Oesterreich" CT Magazin Fuer Computer Technik, Heise Zeitschriften Verlag, Hannover, DE, No. 5, Feb. 24, 2003, p. 38.
Hellerman, H; Hemmendinger, D: "Interrupt" In: Ralston, A; Reilly, E.D.; Hemmendinger, D: Encyclopedia of Computer Science, Fourth Edition 2003, John Wiley & Sons, Chichester, England, pp. 928-931.

* cited by examiner

*Primary Examiner* — Nelson D. Hernández Hernández
(74) *Attorney, Agent, or Firm* — Ridout & Maybee LLP

(57) ABSTRACT

A mobile device with an integrated camera responsive to signals from a camera activator. The mobile device includes application programs capable of editing documents. The user triggers the device operating system to switch from an active application program in which the user is editing a document to a camera application by activating the camera activator. The user then captures an image by again triggering the camera activator, whereupon the active application is restored and the image data is inserted within the document. The captured image is directly inserted into an input field within the open document in the active application.

22 Claims, 3 Drawing Sheets

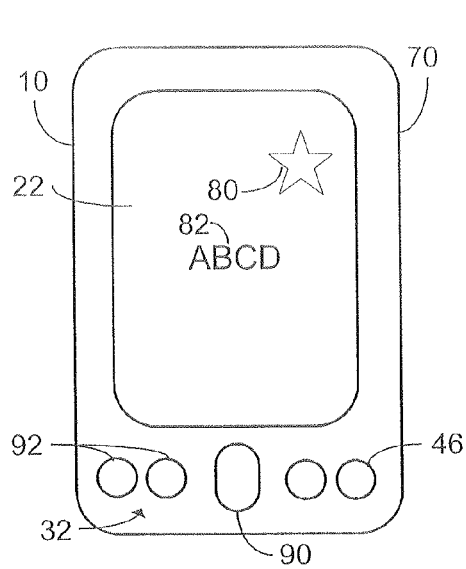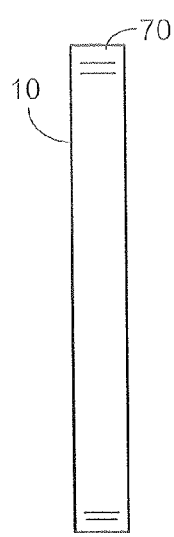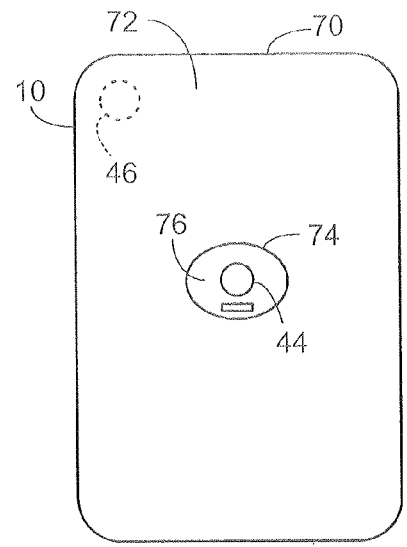
FIGURE 2　　　　FIGURE 3　　　　FIGURE 4
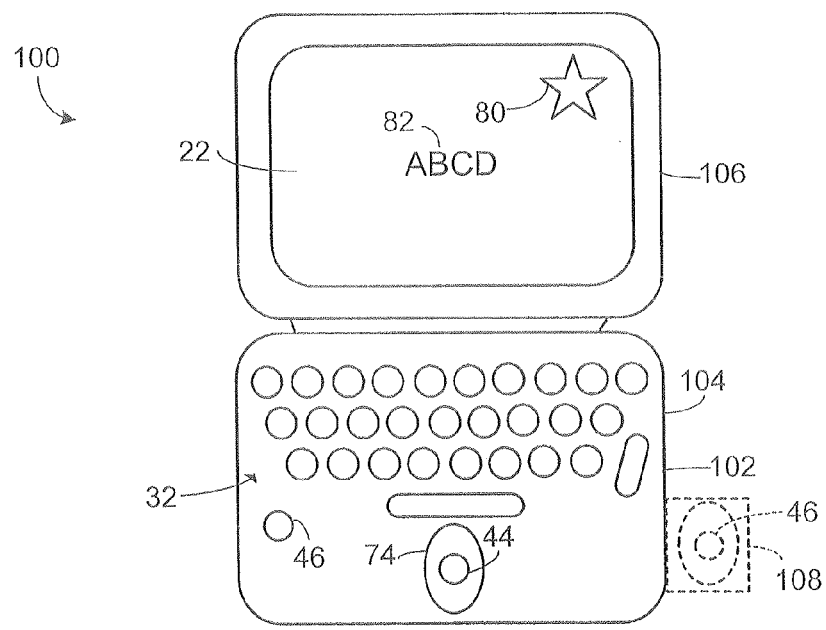
FIGURE 5

DEVICE AND METHOD FOR INSERTING CAPTURED IMAGE DATA INTO A DOCUMENT

CROSS-REFERENCE TO RELATED APPLICATIONS

The present application is a continuation of U.S. patent application Ser. No. 12/051,055 filed Mar. 19, 2008, which is a continuation of U.S. patent application Ser. No. 10/786,002 filed Feb. 26, 2004, and issued as U.S. Pat. No. 7,365,787. The content of the above-noted patent applications and patent are hereby expressly incorporated by reference herein in their entirety.

FIELD

The present invention relates to mobile devices and, in particular, to mobile devices with integrated camera operations.

BACKGROUND OF THE INVENTION

Mobile hand-held computing devices such as personal digital assistants and messaging enabled communications devices are rapidly growing in popularity. More features are being incorporated into mobile hand-held computing devices. For example, there are now messaging enabled mobile phones that have display screens and built-in-cameras. Such phones allow pictures taken by the camera to be displayed on screen and stored on the phone and wirelessly transmitted as digital photos.

In order to incorporate digital photographs into e-mail, memos, word processing documents, tasks, contacts, or calendar entries, the user starts a dedicated camera application on the mobile device. The user then causes the camera to take a photograph and the resulting picture is stored as a digital file. The user then minimizes or closes the camera application and starts or returns to the relevant application program, such as an e-mail program, a scheduling program, or a word processing program, and attaches or inserts the digital file from its storage location in memory.

It will be appreciated that the prior art devices require a complex series of steps to achieve the desired result. In particular, the user must exit an active application, take a photograph, save the photograph, re-enter the application, locate the photograph within the database or file system, and then attach or insert the photograph into an active document in the application. The camera functions as a source of data only to a dedicated camera application, which saves the image data to memory in a database or file system.

SUMMARY OF THE INVENTION

The present invention provides a mobile device and a method of integrating camera operations into a mobile device. In accordance with the present invention, the user triggers the operating system to switch from an active application in which the user is editing a document to a camera application by activating a camera activator. The user then captures an image by subsequently activating the camera activator, whereupon the active application is restored and the image data is inserted in-line within the document.

In one aspect, the present invention provides a method of integrating camera operations into a mobile device, the mobile device including a camera and a camera activator, the mobile device having an active application and a camera application. The method includes the steps of switching from operation of the active application to the camera application in response to detection of a first signal from the camera activator; and detecting a second signal from the camera activator and, in response to detection of said second signal, capturing image data via the camera, resuming operation of the active application, and inserting said image data into an active document open in the active application.

In another aspect the present invention provides a mobile device. The mobile device includes a body; a processor and associated memory housed with said body; a display screen housed within said body and responsive to signals from said processor; a camera attached to said body for capturing images and providing image data for said images to said processor; a camera activator for providing a first signal and a second signal to said processor in response to user activation; and a camera listener interface associated with said processor for switching from an active application program to a camera application in response to said first signal from said camera activator, and, in response to said second signal from said camera activator, resuming said active application program and passing said active application program said image data for insertion into an active document within said active application program; whereby said camera captures said image data in response to said second signal.

In another aspect, the present application describes a method of capturing image data and inserting the image data into an active document on a mobile device, the mobile device including a camera, a camera activator, and a camera listener interface, the mobile device further including an active application in which the active document is open and a camera application. The method includes determining that the active application is open in an editable mode and enabling the camera listener interface in response thereto; and when the camera listener interface is enabled, receiving a first signal from the camera activator, suspending operation of the active application in response to detection of the first signal and invoking the camera application, detecting a second signal from the camera activator, and, in response to detection of the second signal, capturing image data via the camera, and automatically resuming operation of the active application and inserting the image data into the active document open in the active application.

In a further aspect, the present application discloses a mobile device. The mobile device includes a processor and associated memory, the processor being configured to run an active application and a camera application, the active application being configured to open an active document; a camera for capturing images and providing image data for the images to the processor; a camera activator responsive to user activation; and a camera listener interface configured to be enabled when the active application is determined to be in an editable mode. The camera listener interface is further configured to detect a first signal from the camera activator and to cause the processor to suspend the active application in response to the first signal from the camera activator. The camera listener interface is further configured to detect a second signal and, in response thereto, to cause the camera to capture the image data and to cause the processor to resume the active application and to pass the active application the image data for insertion into the active document within the active application.

In yet another aspect, the present application discloses a handheld device. The handheld device includes processing means for running an active application and a camera application, the active application being configured to open an active document; imaging means for capturing images and providing image data for the images to the processing means; activation means responsive to user activation; and a camera listener means configured to be enabled when the active application is determined to be in an editable mode. The camera listener means is for detecting a first signal from the activation means and for causing the processing means to suspend the active application in response to the first signal from the activation means. The camera listener means includes means for detecting a second signal and, in response thereto, causing the imaging means to capture the image data and to cause the processing means to resume the active application and to pass the active application the image data for insertion into the active document within the active application.

In yet a further aspect, the present application discloses a mobile device for capturing image data and inserting the image data into an active document on the mobile device, the mobile device including a camera, a camera activator, and a camera listener interface, the mobile device further including an active application in which the active document is open and a camera application, the mobile device including a processor and memory storing processor-executable instructions. The processor-executable instructions include instructions for determining that the active application is open in an editable mode and enabling the camera listener interface in response thereto; and instructions executable when the camera listener interface is enabled, for receiving a first signal from the camera activator, for suspending operation of the active application in response to detection of the first signal and invoking the camera application, for detecting a second signal from the camera activator, and for capturing image data via the camera in response to detection of the second signal, and automatically resuming operation of the active application and inserting the image data into the active document open in the active application.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which:

FIG. 2 shows, diagrammatically, a front view of an embodiment of a mobile device;

FIG. 3 shows, diagrammatically, a side view of an embodiment of a mobile device;

FIG. 4 shows, diagrammatically, a back view of an embodiment of a mobile device;

FIG. 5 shows, diagrammatically, a front view of a second embodiment of a mobile device.

Similar reference numerals are used in different figures to denote similar components.

DESCRIPTION OF SPECIFIC EMBODIMENTS

The following description of one or more specific embodiments of the invention does not limit the implementation of the invention to any particular embodiment. In particular, the present invention is not limited to any particular operating system, mobile device architecture, mobile device form factor, or computer programming language.

Persons ordinarily skilled in the art will also understand that the references herein to a camera activator or, specifically, a camera button, are not intended to limit the present invention to any particular type or style of user activation or triggering device. Any activation device that a user is capable of manipulating in order to cause a signal to be sent to the processor may be employed in place of a conventional camera button. The terms "camera button" or "camera activator" herein are meant to encompass all such user activation devices, including buttons, keys, keypad contacts, switches, dials, touch pads, touch screens, etc. In some embodiments, the "camera activator" may be a particular combination of keys on a keyboard, whereby such keys have been assigned the function of operating as a camera button. For example, Ctrl-Alt-C may be designated as the "camera activator" combination of keystrokes. The term "camera activator" is also intended to encompass non-physical devices, including software triggers, such as a dropdown menu, "softkey", or a timer. It will also be understood that the term "camera activator" may refer to more than one activator if separate activators are used to provide a first signal and a second signal, respectively.

Figure 1:
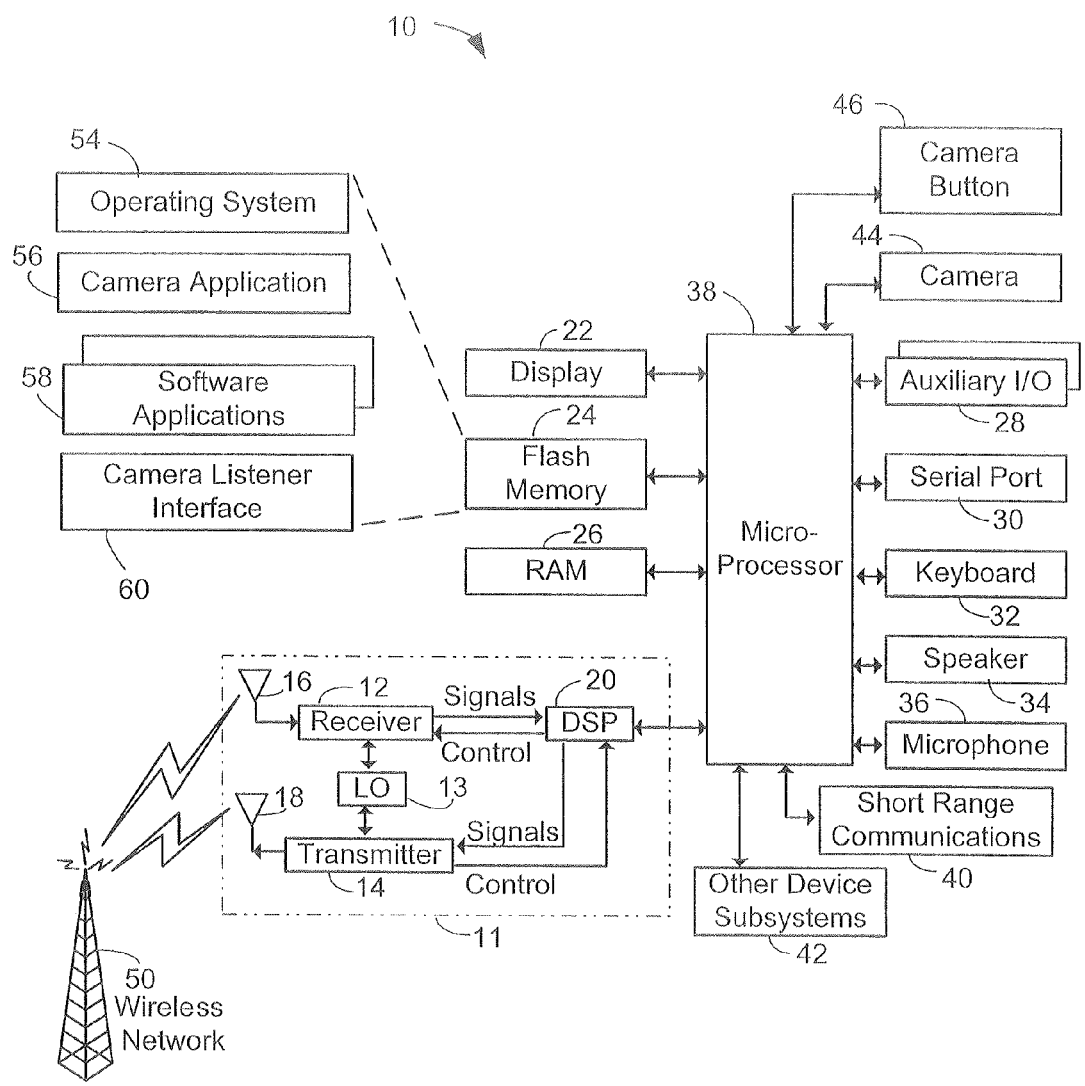
FIG. 1 shows a block diagram of an embodiment of a mobile device system.

Referring now to the drawings, FIG. 1 is a block diagram of a hand-held computing device to which the present invention is applied in an example embodiment. In the example embodiment, the hand-held computing device is a two-way mobile communication device 10 having data and possibly also voice communication capabilities. In an example embodiment, the device has the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things. In various embodiments, the present invention may also be applied to handheld computing devices, such as PDAs and digital cameras, that are not enabled for communications.

In this embodiment, in which the device 10 is enabled for communications, the device 10 includes a communication subsystem 11, including a receiver 12, a transmitter 14, and associated components such as one or more, preferably embedded or internal, antenna elements 16 and 18, and a processing module such as a digital signal processor (DSP) 20. In some embodiments, the communication subsystem includes local oscillator(s) (LO) 13, and in some embodiments the communication subsystem 11 and a microprocessor 38 share an oscillator. As will be apparent to those skilled in the field of communications, the particular design of the communication subsystem 11 will be dependent upon the communication network in which the device is intended to operate.

Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 50 via the antenna 18.

The device 10 includes the microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The device 10 of the present system includes an integral camera 44 that interacts with microprocessor 38. The device 10 may also include a dedicated camera button 46 for triggering operation of the camera, as will be further described below. In some embodiments, the dedicated camera button 46 may be integrated within the keyboard or keypad 32.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including at least data and voice communication applications for example, will normally be installed on the device 10 during manufacture. Further software applications 58 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items within a software application 58, such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

With reference to FIGS. 2 to 4, in an example embodiment, the components and subsystems of mobile device 10 are housed within a hard plastic main body case 70 that is configured to be held with one or two hands while the device 10 is in use. The main body case 70 may be a single piece of may include two or more portions coupled together. For example, in one embodiment, the device 10 is a "flip phone" and the main body case 70 includes two portions hinged together such that the two portions may be brought into closed contact with one another when the device 10 is not in use. The various components of the device 10 need not be located in the same portion of the main body case 70.

The case 70 may include a hook (not shown) so that it can be secured to a user's belt or pant's top, or it may be used in conjunction with a soft case (not shown) that can be mounted to the user's belt or pant's top and into which the mobile device 10 can be inserted for carrying. Mobile device 10 will typically be small enough to fit inside a standard purse or suit jacket pocket. The screen 22 is visible from the front of the device, as is keypad or keyboard 32. The keyboard 32 includes buttons or keys 90, 92 positioned to be actuated by the thumbs or fingers of the user. In the illustrated embodiment of FIG. 2, the keyboard has relatively few keys, however in some embodiments, the keyboard includes 26 or more alphanumeric and control keys.

The device 10 includes a camera activator, which in one embodiment is a camera button 46, as shown in FIG. 2. The camera button 46 need not be located on the front of the device 10; it could be in other locations, such as on the back of the device 10 as shown in FIG. 4 (in phantom). Also seen in FIG. 4, the case 70 includes a substantially planar back wall 72, which has an opening 74 provided therethrough. A transparent lens 76 covers the opening 74, behind which the camera 44 is located.

In various embodiments, the camera 44 is located in different locations than on the back of the device 10, and the handheld device 10 has different configurations other than the example embodiment described above. For example, the camera 44 may be located facing outward from the front of the device 10. By way of non-limiting example, FIG. 5 shows a front view of a handheld device 100 according to another embodiment of the invention. Device 100 is similar to device 10, however the keyboard 32 of device 100 includes a thumb-activated QWERTY keyboard next to which camera 44 is located, and the main body or case 102 of the device 100 includes first and second portions 104, 106 that are pivotally mounted together. Second case portion 106 houses display 22, and the first case portion 104 houses the keyboard 32, which is configured for thumb typing. In hand-held device 100, the camera 44 is provided through opening 74 on the front of the first case portion 104. The camera 44 faces the same direction as the keyboard 32 for capturing images of the user while operating the device. In such an embodiment, the camera 44 may be configured to capture successive images in a video format so as to provide streamed video as a webcam.

In some embodiments, the camera is pivotally mounted to the case of the handheld device such that it can be rotated to face in a direction desired by the user. By way of example, a pivotally mounted camera unit 108 is shown in phantom in FIG. 5. The camera unit 108 may be detachable from case 102.

Referring now to FIGS. 1 and 2, at least some of the software applications 58 that are loaded onto the device 10 will, together with operating system 54, implement graphical user interfaces that display text 82 and/or graphics 80 on the screen 22. The graphics 80 displayed by the device 10 may include digital pictures or video captured by the camera 44. The software applications 58 may include a variety of application programs, such as an e-mail program, a word processing program, a spreadsheet program, a calendar program, a contacts program, etc. When operating, such software applications 58 will often have an active document open that is being composed, created, or modified by the user. For example, a word processor may have an active document open into which the user is typing text via the keyboard 32; an e-mail program may have a draft e-mail open that the user is composing; and a contacts program may have an individual's profile information file open for modification by the user. It will be understood that the term "document" in this case is used generically to refer to any object, file or structure having content which may be edited by the user via the associated application program. Documents according to the present invention may include documents such as, but not limited to, e-mail messages, instant messages, word processing documents, spreadsheets, contact entries, personal profiles, calendar entries, memos, task reminders, and multimedia messages. Similarly, the terms "application program" and "software application" in this context refer to any application program for creating, composing, editing, or modifying documents.

The device 10 includes a camera application 56 for processing signals received by the microprocessor 38 from the camera 44 and a camera listener interface 60 for recognizing activation of the camera button 46 and coordinating interoperation of the camera application 56 and any active software applications 58. All or parts of the camera listener interface 60 and/or the camera application 56 could, in various embodiments, be integrated into the operating system 54 and/or other software applications 58. In some embodiments some of the camera listener interface functions and/or camera application functions could be implemented in appropriately configured hardware or firmware.

The camera listener interface 60 monitors the camera button 46. When a user activates the camera button 60, a signal is sent to the microprocessor 38. This signal may be an interrupt signal. When the camera listener interface 60 is invoked, it may notify the microprocessor 38 that it will be the handler of interrupts associated with the camera button 46. Thereafter, when the camera button 46 is pressed, the camera listener interface 60 is notified.

The camera listener interface 60 responds to activation of the camera button 46 in at least two ways. When the camera button 46 is first activated, the camera listener interface 60 causes the operating system 54 to interrupt or pause operation of the active software application 58. The operating system 54 then invokes an instance of the camera application 56, if one is not already running in the background. The camera application 56 may be invoked in a temporary viewfinder mode, wherein the display 22 functions as a viewfinder displaying the images being received by the photosensors within the camera 44. Using the viewfinder mode, the user can position the camera 44 so as to frame the image or view desired. In this mode, there may be additional functions or operation that the user may have available, including a zoom function or various settings, such as contrast, flash, red-eye reduction, etc.

With the camera application 56 active and functioning in a viewfinder mode, the user positions the device 10 such that the camera 44 is focused upon the desired scene or view. The user then activates the camera button 46 so as to capture the image seen by the camera 44. Upon activating the camera button 46, the camera application 56 receives image data from the camera 44 corresponding to the image received by the camera 44 at the time the camera button 46 is activated. The camera application 56 creates an image object containing the image data captured by the camera 44. In some embodiment, the image data may be saved in a file in memory.

The activation of the camera button 46 also triggers the camera listener interface 60 to cause the operating system to close or minimize the camera application 56 and to return to the active software application 58. Upon returning, the active software application 58 is passed the image object created by the camera application 56, and the image object is inserted in-line within the active document. For example, a digital image captured by the camera 44 would be inserted into the open e-mail, word processing document, contact profile, or calendar event at the location where the cursor was when the operation of the software application 58 was suspended. It will be understood that active software application 58 is capable of handling image data and the document includes input fields that allow for the input of graphic elements, such as digital images.

Accordingly, while a user is editing or creating a document using the active software application 58, the user can instantly and seamlessly switch the device 10 to a camera mode by simply activating the camera button 46. By activating the camera button 46 again while in the camera mode, an image is captured and inserted into the open document that the user was editing or creating, and control is then returned back to the active software application 58 to allow the user to continue editing or creating the document.

In some embodiments, the functioning of the camera listener interface 60 may only be enabled when there is a software application 58 active and when that active software application 58 has a document open in an editable mode. Accordingly, prior to triggering the invocation of the camera application 56, the camera listener module 60 may be configured to perform a check to determine if there is an active software application 58, whether that active software application 58 is of a type that is capable of handling image data, and whether that active software application 58 is in an 'editing mode', meaning that a document is open and able to accept image data. In such an embodiment, the camera listener module 60 may be configured to ignore the activation of the camera button 46 if an appropriate document and software application 58 are not active on the device 10. Alternatively, the active software application 58 may be configured to invoke the camera listener interface 60 when it enters an editing mode, thereby ensuring that the camera listener interface 60 only functions when an appropriate software application 58 is active and in an editing mode. In such an embodiment, the active software application 58 may disable or close the camera listener interface 60 when the software application 58 exits its editing mode, such as when the user begins manipulating pull down menus or otherwise renders the open document inactive. Those of ordinary skill in the art will understand from the present description that other methods or mechanisms may be employed to ensure the camera listener interface 60 is enabled when an active application has a document open with an active input field capable of receiving image data.

Figure 6:
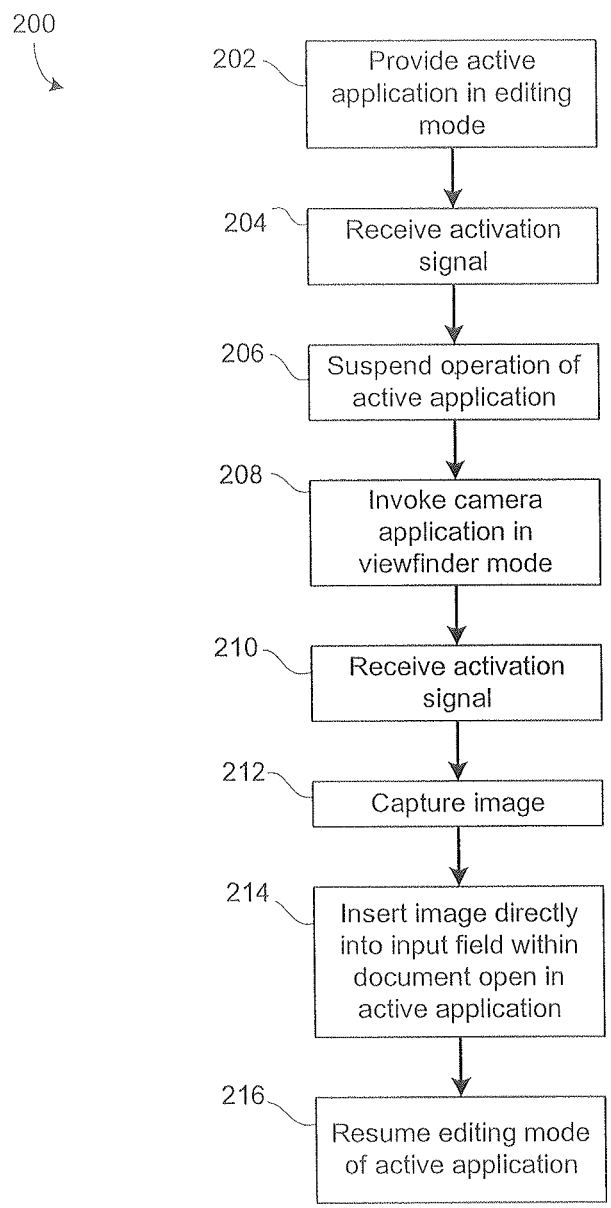
FIG. 6 shows, in flowchart form, a method of integrating the operation of a camera and mobile device.

Reference is now made to FIG. 6, which shows, in flowchart form, a method 200 for integrating camera operations into a mobile device. The first step 202 of the method 200 is to provide for an active software application 58 (FIG. 1) operating in an editing mode. As discussed above, this may condition may be checked by the camera listener interface 60 (FIG. 1) or the camera listener interface 60 may only be invoked by the active software application 58 entering the editing mode. Those of ordinary skill in the art will appreciate that there are various mechanisms or arrangements to test for this condition or to ensure that it is met.

In step 204, the operating system 38 (FIG. 1) receives an activation signal from the camera button 46 (FIG. 1), indicating that the user has triggered the camera button 46. The operating system 38 notifies the camera listener interface 60 that the camera button 46 has been activated and, in step 206, the camera listener interface 60 instructs the operating system 38 to suspend or switch away from operation of the active application. Then in step 208, the camera application 56 (FIG. 1) is invoked to permit the user to utilize the device 10 (FIG. 1) in a camera mode.

A second activation signal is received in step 210 when the user activates the camera button 46 while the device 10 is in camera mode. In step 212, in response to the activation of the camera button 46, the camera 44 (FIG. 1) and the camera application 56 capture an image. The image may be stored as image data within an image object in memory. The image data may also or alternatively be stored within a file in memory.

In step 214, also in response to the second activation signal from the camera button 46 received in step 210, the camera listener interface 60 causes the operating system 38 to restore or switch back to the active software application 58, and the image captured in step 212 is inserted directly into an input field in an active document open within the active software application 58. Then, in step 216, the operating system 38 returns control to the active software application 58 to continue operation in the editing mode.

Accordingly, using the above-described method 200, the camera 44 functions as an "always-available" input device that can be used to embed images and image data into documents on the fly.

An example of a simplified code listing for implementing a program to perform, at least in part, the method 200 is provided below:

```
// Set up the camera application
public class CameraEnabledApp
{
    // Instantiate the application and start listening for operating
system events
    public static void main( )
    {
        CameraEnabledApp myApp = new CameraEnabledApp( );
        //Create an instance of the camera application
        theApp.enterEventDispatcher( );        //Wait for
```

-continued

```
events
    }
    //Main class for the application. Here a new screen is created
and displayed
    public CameraEnabledApp( )
    {
        pushScreen(new ApplicationScreen( ));      //When the
                                    application starts, create a
                                    new screen and display it
    }
}
//Logic for the application screen. This implements
// a CameraListener that will allow events from the camera to be
captured.
class AppliationScreen implements CameraListener,
KeyboardListener
{
    public ApplicationScreen( )
    {
        add(new TextImageField( ))      //Add an input field to
                                    the screen; the input field accepts
                                    text or images
    }
    // This method from the CameraListener interface is invoked
when a camera event occurs.
    public onCameraEvent(Image myCaputredImage)
    {
        //This method is invoked when the CameraListener is
implemented and the user presses the camera key
        //In this specific instance, the image data
(myCapturedImage) is added to the TextImageField.
        TextImageField.addObject(myCapturedImage);
    }
}
```

Those of ordinary skill in the art will appreciate that, although the foregoing specific embodiments refer to the camera listener interface 60 as being embodied as an application programming interface (API), the present invention is not limited to such an API. The functions and operations of the camera listener interface 60 may be embodied within the operating system 38, the basic input output system (BIOS), the software application 58, or otherwise.

The present invention is not limited to a particular processor architecture, operating system, or computer programming language. Any limitations presented as a result of specific architectures, operating systems, or computer programming languages are not intended as limitations of the present invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method executable on a processor of a mobile device, the mobile device including a camera, a camera activator, a camera application and an active application in which an active document is open, the method comprising:
   detecting a first signal from the camera activator when the open active document is able to accept image data;
   switching from operation of the active application to the camera application in response to detection of the first signal from the camera activator;
   detecting a second signal from the camera activator; and in response to detection of said second signal, capturing said image data via the camera and automatically inserting the image data in-line into the active document open in the active application.

2. The method of claim 1, further comprising: following capturing said image data via the camera, resuming operation of the active application.

3. The method of claim 2 wherein resuming operation of the active application comprises automatically resuming operation of the active application.

4. The method of claim 1 wherein detecting the first signal from the camera activator when the open active document is able to accept image data comprises: upon detecting the first signal, determining that the active document is able to accept image data.

5. The method of claim 1 wherein detecting the first signal from the camera activator when the open active document is able to accept image data comprises: determining that the active application is able to accept image data and enabling detection of a signal from the camera activator in response thereto; and detecting the first signal from the camera activator.

6. The method claimed in claim 1, wherein switching from operation of the active application to the camera application comprises suspending the active application and invoking the camera application.

7. The method claimed in claim 1, wherein the mobile device includes a display screen and wherein the camera application operates in a viewfinder mode for displaying a camera view on the display screen.

8. The method claimed in claim 1, capturing the image data comprises creating an image object containing the image data.

9. The method claimed in claim 1, wherein inserting the image data includes passing the image data to the active application, whereupon the active application inserts the image within an input field in the active document.

10. The method claimed in claim 1, wherein the camera activator includes a triggering device selected from the group including a button, a key, a switch, a dial, a touch pad, a touch screen, a key combination, and a software device.

11. The method claimed in claim 1, wherein the active document includes a document selected from the group including an e-mail message, an instant message, a word processing document, a spreadsheet, a contact entry, a personal profile, a calendar entry, a memo, a task reminder, and a multimedia message.

12. The method of claim 1 wherein the active application has a cursor at a location in the active document, and wherein inserting the image data in-line into the active document comprises inserting the image data at the location of the cursor when the operation of the active application was switched to the camera application.

13. A mobile device, comprising:
a processor;
memory;
a camera; and
a camera activator;
the processor configured to
detect a first signal from the camera activator when the processor is running an active application in which an active document able to accept image data is open,
switch from operation of the active application to a camera application in response to detection of the first signal from the camera activator,
detect a second signal from the camera activator, and
in response to detection of the second signal, capture image data on the camera and automatically insert the image data in-line into the active document open in the active application.

14. The mobile device of claim 13, wherein the processor is configured to: following the capture of image data on the camera, resume operation of the active application.

15. The mobile device of claim 14, wherein the processor is configured to resume operation of the active application automatically.

16. The mobile device of claim 13 wherein the processor is configured to detect the first signal from the camera activator when the processor is running an active application in which the active document able to accept image data is open by, upon detecting the first signal, determining that the active document is able to accept image data.

17. The mobile device of claim 13 wherein the processor is configured to detect the first signal from the camera activator when the processor is running an active application in which the active document able to accept image data is open by determining that the active application is able to accept image data and enabling detection of a signal from the camera activator in response thereto; and detecting the first signal from the camera activator.

18. The mobile device of claim 13 wherein the processor is configured to switch from operation of the active application to the camera application by suspending the active application and invoking the camera application.

19. The mobile device of claim 13 wherein the processor is configured to insert the image data into an input field in the active document.

20. The mobile device of claim 13 wherein the camera activator includes a triggering device selected from one or a combination of the group including a button, a key, a switch, a dial, a touch pad, a touch screen, a key combination, and a software device.

21. The mobile device of claim 13 wherein the active document includes a document selected from the group including an e-mail message, an instant message, a word processing document, a spreadsheet, a contact entry, a personal profile, a calendar entry, a memo, a task reminder, and a multimedia message.

22. The mobile device of claim 13 wherein the active application has a cursor at a location in the active document, and wherein the processor is configured to insert the imade data into the active document at the location of the cursor when the operation of the active application was switched to the camera application.

* * * * *